(12) United States Patent
Mangel

(10) Patent No.: US 6,332,276 B1
(45) Date of Patent: Dec. 25, 2001

(54) ARTICULATE LASER DEGREE FINDER

(76) Inventor: Ronnie L. Mangel, Lot 6 Jamison Rd., Ponca City, OK (US) 74604

( * ) Notice: Subject to any disclaimer, the term of this patent is extended or adjusted under 35 U.S.C. 154(b) by 0 days.

(21) Appl. No.: 09/538,747

(22) Filed: Mar. 30, 2000

(51) Int. Cl.$^7$ .............................. G01C 15/00; G01C 1/00
(52) U.S. Cl. ................................ 33/286; 33/281; 33/273; 33/412
(58) Field of Search ............................. 33/281, 282, 283, 33/285, 286, 290, 292, 293, 295, 299, DIG. 21, 347, 370, 371, 529, 272, 273, 451, 412

(56) References Cited

U.S. PATENT DOCUMENTS

| 3,909,952 | * | 10/1975 | Lagasse ................................... 33/283 |
| 3,959,888 | * | 6/1976 | Baker et al. ............................ 33/282 |
| 4,138,826 | * | 2/1979 | Inge ....................................... 33/281 |
| 4,208,801 | * | 6/1980 | Blair ...................................... 33/281 |
| 4,394,799 | * | 7/1983 | Moree et al. .......................... 33/371 |
| 4,635,376 | * | 1/1987 | Fry ........................................ 33/347 |
| 4,912,851 | | 4/1990 | Rando et al. . |
| 4,988,192 | | 1/1991 | Knittel . |
| 5,012,585 | | 5/1991 | DiMaggio . |
| 5,144,487 | | 9/1992 | Hersey . |
| 5,212,889 | | 5/1993 | Lysen . |
| 5,218,770 | | 6/1993 | Toga . |
| 5,394,616 | | 3/1995 | Claxton . |
| 5,428,915 | * | 7/1995 | King ...................................... 42/101 |
| 5,539,990 | | 7/1996 | Le . |
| 5,671,561 | * | 9/1997 | Johnson et al. ........................ 42/103 |
| 5,782,002 | * | 7/1998 | Reed ..................................... 33/283 |
| 5,782,003 | * | 7/1998 | Bozzo .................................... 33/285 |
| 5,864,956 | | 2/1999 | Dong . |
| 5,907,907 | | 6/1999 | Ohtomo et al. . |
| 5,930,904 | * | 8/1999 | Mualem ................................. 33/281 |
| 6,035,540 | * | 3/2000 | Wu et al. ............................... 33/286 |
| 6,052,911 | * | 4/2000 | Davis .................................... 33/286 |
| 6,134,795 | * | 10/2000 | Hitchcock ............................. 33/451 |
| 6,163,969 | * | 12/2000 | Jan et al. ............................... 33/282 |
| 6,195,902 | * | 3/2001 | Jan et al. ............................... 33/286 |
| 6,230,431 | * | 5/2001 | Bear ...................................... 42/103 |
| B1 4,221,483 | | 8/1991 | Rando . |

FOREIGN PATENT DOCUMENTS

| 0 162734 A2 | 11/1985 | (EP) . |
| 0 759 538 A2 | 2/1997 | (EP) . |
| 2-132320 | 5/1990 | (JP) . |
| WO 92/20998 | 11/1992 | (WO) . |

* cited by examiner

*Primary Examiner*—Diego Gutierrez
*Assistant Examiner*—Yaritza Guadalupe
(74) *Attorney, Agent, or Firm*—Richard C. Litman

(57) ABSTRACT

An articulate laser degree finder tool and attachments for use in establishing a precise level line ranging from the horizontal to a vertical position in degrees for use in the construction industry.

12 Claims, 18 Drawing Sheets

ARTICULATE LASER DEGREE FINDER

BACKGROUND OF THE INVENTION

1. Field of the Invention

The present invention relates generally to laser measuring devices. More specifically, the invention is a versatile mountable measuring tool and attachments for its use on various substrates in establishing a precise point or a level line in directions ranging from a horizontal to a vertical position in precise degrees for use in the construction industry.

2. Description of the Related Art

The relevant art of interest describes various laser measuring devices but none discloses the present invention. There is a need for an angular measurement device in the construction industry which can be placed in any position on a pipe, ground, etc. and yet accurately measure angular positions. The related art will be discussed in the order of perceived relevance to the present invention.

U.S Pat. No. 4,988,192 issued on Jan. 29, 1991, to Ronald A. Knittel describes an electronically controlled laser theodolite comprising a horizontally and vertically movably supported laser which is mounted in a forked carrier and tripod so as to be rotatable 360° about a tilt axis which extends at right angles to the laser exit beam and which intersects this beam in the manner of a theodolite. The laser theodolite is distinguishable for its radically different structure including an electronically controlled (by at least two motors) forked carrier for the laser requiring at least two microscopes with deflecting mirrors.

U.S. Pat. No. 5,864,956 issued on Feb. 4, 1999, to Dawei Dong describes a laser level line and plumb line combination device for construction use comprising stacking (by virtue of centered posts) at least two combined square alloy rulers, each ruler unit having 1.5 volt batteries and two bubble levels to level in all directions. A line generator is mounted in front of a laser diode module. The housing of the ruler unit must be machined with an accurate plane structure and vertical angles. The device is usable for hardwood layout and cutting, carpet cutting, installing drop ceilings, mounting cabinets, laying tiles, installing doors and windows, building outdoor decks, and the squaring of any plane object. The combination device is distinguishable for requiring electrical power, accurately planed and vertical angled housings, and two levels on the same horizontal surface of a housing.

U.S. Pat. No. 5,539,990 issued on Jul. 30, 1996, to Mike Le describes a three-dimensional optical levelling, plumbing and angle-calibrating instrument device comprising three lasers in a holder connected to a large battery containing housing to establish a plumb line in a C-shaped holder. The lasers are arranged with two lasers mounted one above the other with the third laser mounted at a right angle to the other lasers. Each laser has at least one cylindrical or prism collimating lens to form two perpendicular intersecting lines with the first two lasers on one wall and a vertical line on an adjoining wall with the third laser. The device is distinguishable for its lack of leveling devices and angle measuring scales.

U.S. Pat. No. 5,144,487 issued on Sep. 1, 1992, to William H. Hersey describes a portable, battery powered laser tool for simultaneously indicating level, plumb and square alignment. One laser diode emits light which are divided into five beams leaving the gimbal mounted tubular projection unit. The housing is box-shaped with a box-shaped nose portion to be placed on a flat surface. A rechargeable battery is encased. The laser tool is distinguishable for its multi-beam output structure.

U.S. Pat. No. 4,912,851 issued on Apr. 3, 1990, to Joseph F. Rando et al. describes a battery operated level/plumb indicator device with a tilt compensation up to about 5° off level and a manual selector element for shifting the beam from vertical to horizontal orientation. Two single mirrors and a two-mirror right-angle deflector mirror are used to focus the laser light in a rectangular box housing. The device is distinguishable for its required mirror structure and tilt compensation element.

U.S. Pat. No. 4,221,483 issued on Sep. 9, 1980, to Joseph F. Rando describes a battery operated laser beam level instrument which is box-shaped to attach to a tripod. A bubble level is mounted on top and two manually adjustable screws are positioned on the base plate. The laser diode is directed vertically downward to emit light collimated by a pendulous, positive lens and rotatable mirrors. A glass plate positioned between the laser and lens is tiltable in two orthogonal degrees of adjustment for fine tuning. The instrument is distinguishable for its tiltable glass plate, pendulous positive lens and rotatable mirrors structure for focusing the laser light.

U.S. Pat. No. 5,012,585 issued on May 7, 1991, to Charlie J. DiMaggio describes a laser plumb-bob apparatus to be attached to various walls and ceiling of a room. The apparatus comprises a focusing lens on a telescopic housing of a topmost cylindrical housing containing an on/ff switch. An objective lens is positioned at the junction with a spherical housing which also contains a laser oscillator at the junction with the bottommost cylindrical housing containing a battery pack housing. The spherical housing has a ring support with tripod legs. The laser plumb-bob apparatus is distinguishable for its dissimilar structure.

U.S. Pat. No. 5,212,889 issued on May 25, 1993, to Heinrich Lysen describes a motor operated (battery) plumb device to determine verticals and horizontals, in which a direction determination unit with a laser is suspended from a universal joint so that it is freely usable, so that after leveling out in the equilibrium state, a directional light beam indicates the vertical direction. A lower fixed and concave portion of the movable joint is rigidly connected to a stand by means of a housing. The lower joint part has a lubricant supply line through which a lubricant and gases can be introduced to a groove located on the upper joint part and positioned so as to be between the upper and lower joint parts. A bubble level is positioned above the pentaprism and the convex joint lens body. The plumb device is distinguishable for its pentaprism, and the convex joint lens body requiring lubrication and gases.

U.S. Pat. No. 5,394,616 issued on Mar. 7, 1995, to Douglas Claxton describes a laser positioning device comprising a torpedo level having a protractor and mounting magnets. The battery operated laser is positioned on one end of the vertical protractor. The device is distinguishable for its torpedo level and mounting magnets.

U.S. Pat. No. 5,218,770 issued on Jun. 15, 1993, to Noriyuki Toga describes a surveying machine for construction work comprising a rotating projector adapted for rotational projection of at least a pair of laser beams in perpendicular planes. The device is distinguishable for requiring at least a pair of lasers.

U.S. Pat. No. 5,907,907 issued on Jun. 1, 1999, to Fumio Ohtomo et al. describes a laser leveling system. A rectangular box-shaped main unit has an operation panel under a rotating unit which houses a laser. The automatic angle compensation comprises a multiplicity of mirrors, lens and prisms to divide the laser beam to two orthogonal beams emitted from the rotating unit. The main unit housing has a first bubble level on one wall and a second bubble level in the leveling base (FIG. 1). The leveling base in FIG. 7 has another pair of bubble levels arranged orthogonally with level adjusting knobs on the same horizontal surface. The main unit can be attached in either a vertical or horizontal position. The device is distinguishable for its multiple bubble levels and a rotating laser unit.

EPO Patent Application No. 0 162 734 A2, published on Nov. 27, 1985, for Satoshi Hirano et al. describes a laser surveying instrument comprising a first Porro prism in a detachable and rotatable housing rotated by a motor and pulley system in a boxed housing containing in alignment a first glass pane, projection lens, a second glass pane, a second Porro prism, and a semiconductor laser. The first prism in its rotatable housing is supported by a bearing element attached by four ribbons to the bottom of the boxed housing. Two leveling knobs level the boxed housing relative to an adjustable table. A battery box containing batteries is attached to one side of the boxed housing having an on/off switch to operate the motor. The surveying instrument is distinguishable for its multiple lens requirement and motor drive.

Japan Patent No. 2-132,320 issued on May 21, 1990, to Noriyuki Toga describes a surveying instrument for simultaneously defining points by a laser on four stakes spaced at the corners of a square or rectangle. The instrument has an optical system containing four reflecting mirrors and four half-mirrors. The surveying instrument is distinguishable for its simultaneously projected four separate beams.

PCT Patent Application No. WO 92/20998 published on Nov. 26, 1992, for Ulf Ogren describes a spirit level device containing a horizontal and vertical bubble levels, a laser for emitting a flashing light (by a circuit board), and batteries. The spirit level device is structured with conventional top and bottom abutment surfaces or flanges containing a centered T-channel. A cavity with a circular cross-section is positioned proximate the bottom flange. The device is distinguishable for lacking leveling elements and attachment elements.

EPO Patent Application No. 0 759 538 A2 published on Feb. 26, 1997, for Fumio Ohtomo et al. describes a laser system used for surveying which includes an optical fiber, a heat sink and isolation of the laser heat from the optical system. The optical fiber inputs the laser beam into a rotatable body tube having a collimator lens. The laser system can be incorporated in either a theodolite or rotary laser irradiating device. The laser system is distinguishable for its required optical fiber, heat sink and isolation of the laser generated heat from the optical system.

None of the above inventions and patents, taken either singularly or in combination, is seen to describe the instant invention as claimed. Thus, an articulate laser degree finder system solving the aforementioned problems is desired.

SUMMARY OF THE INVENTION

The invention is a tool and attachments for use in establishing a precise level line in either a horizontal or vertical position in degrees for use in the construction industry.

Accordingly, it is a principal object of the invention to provide an articulate laser degree finder system.

It is another object of the invention to provide an articulate laser degree finder system for laying out piping or foundations for a building.

It is a further object of the invention to provide an articulate laser degree finder system which utilizes existing piping as bases for measurement.

Still another object of the invention is to provide an articulate laser degree finder system which utilizes a photographer's tripod as a base.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to a versatile laser tool which can measure angles of deviation from either horizontal or vertical bases by providing various attachment bases which can attach to pipes, horizontal surfaces and vertical surfaces.

Figure 1:
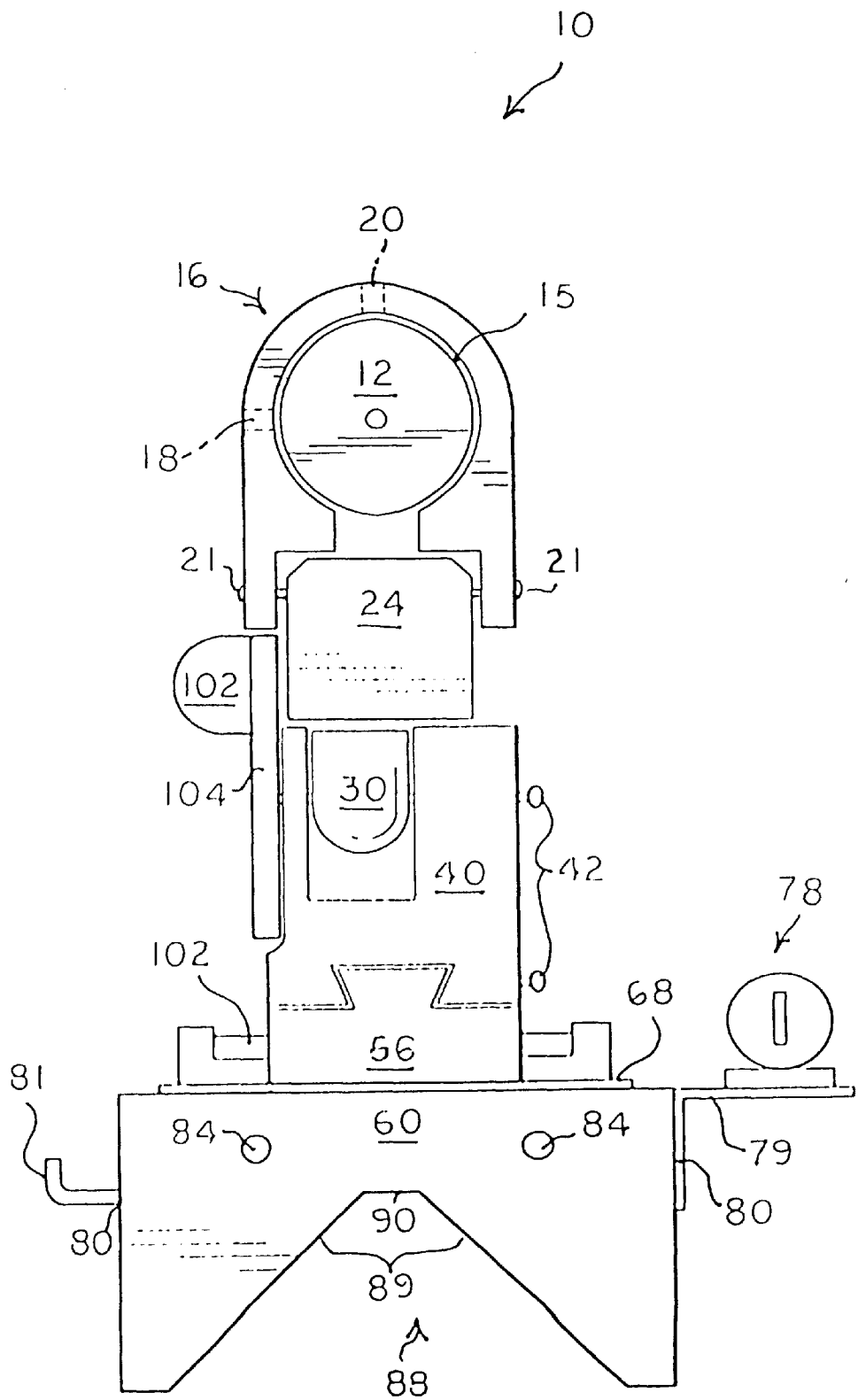
FIG. 1 is a schematic front view of an articulate laser degree finder device with a first embodiment of a main base block having an inverted V channel according to the present invention.
Figure 2:
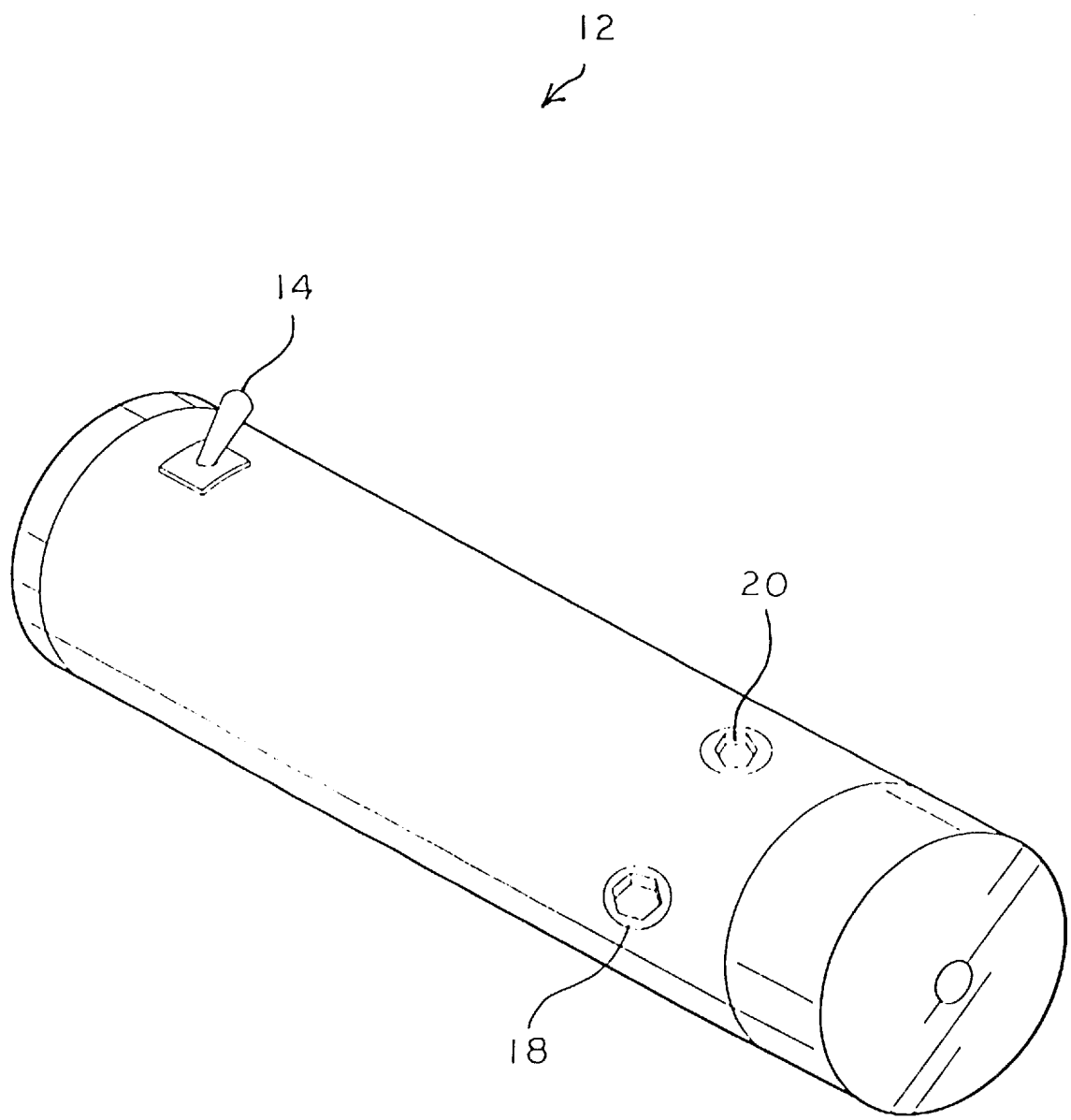
FIG. 2 is a perspective view of a laser element used with the degree finder device.
Figure 3:
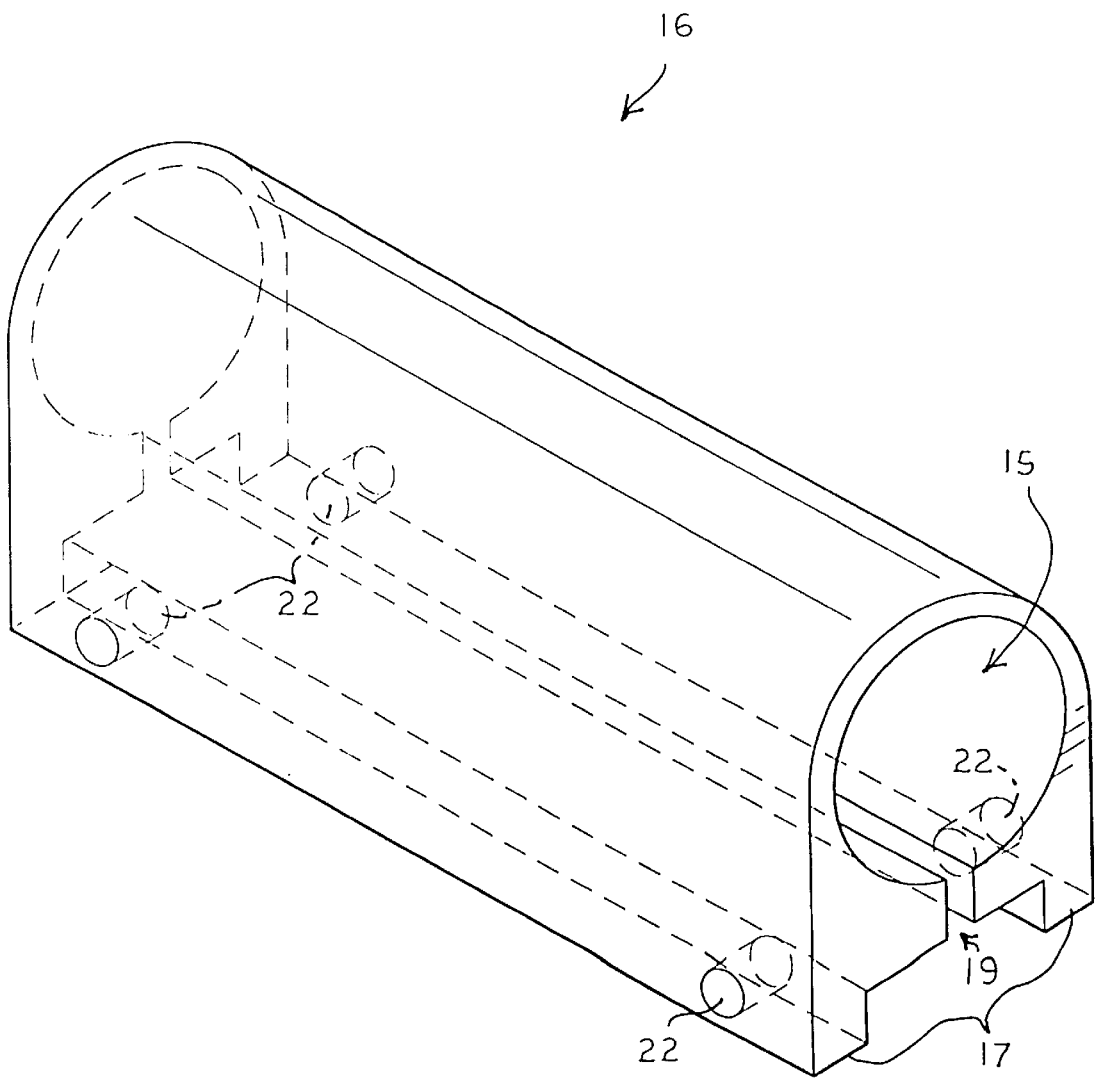
FIG. 3 is a perspective view of a laser retainer jacket.
Figure 4:
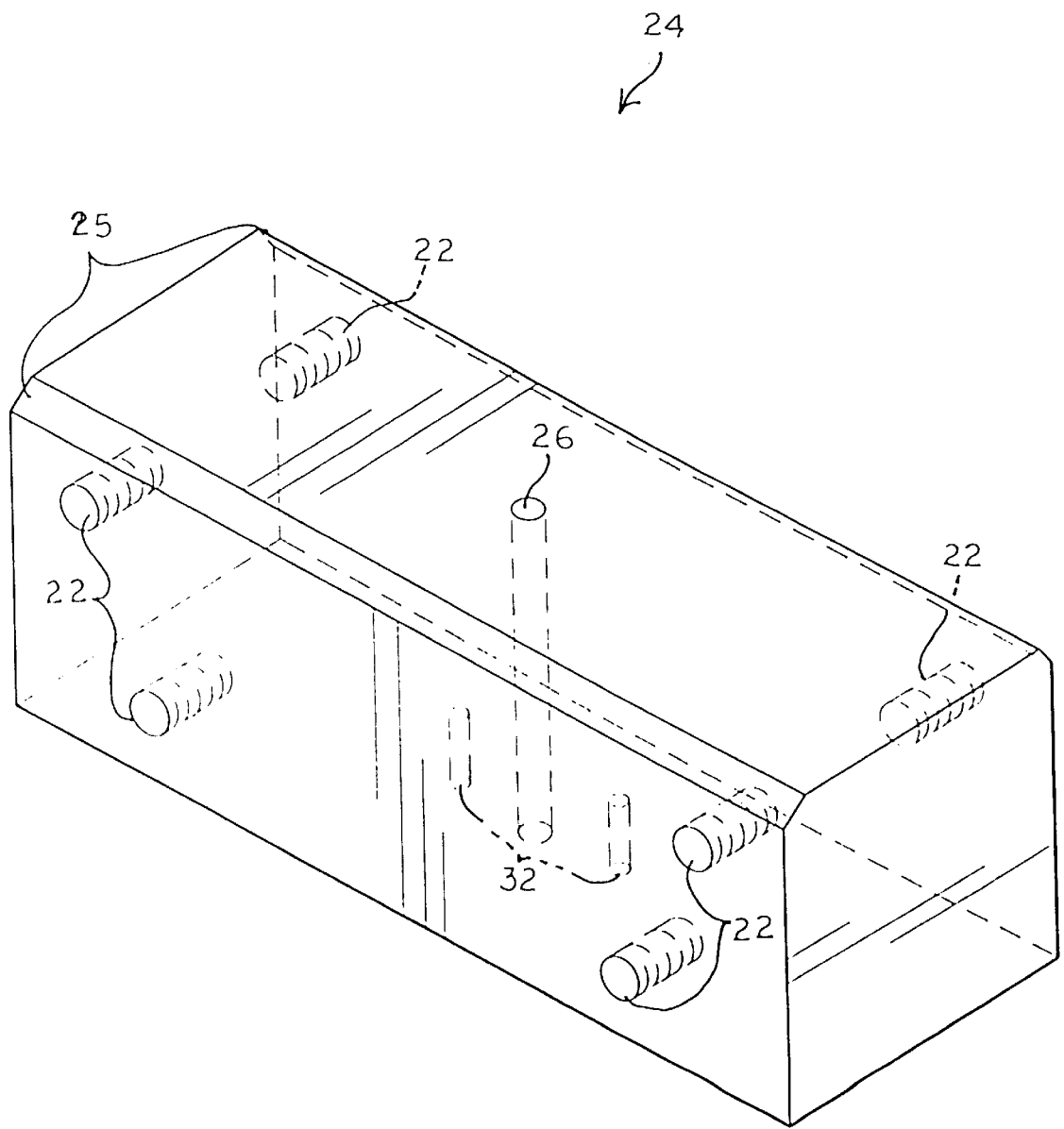
FIG. 4 is a perspective view of a laser adapter block.
Figure 5:
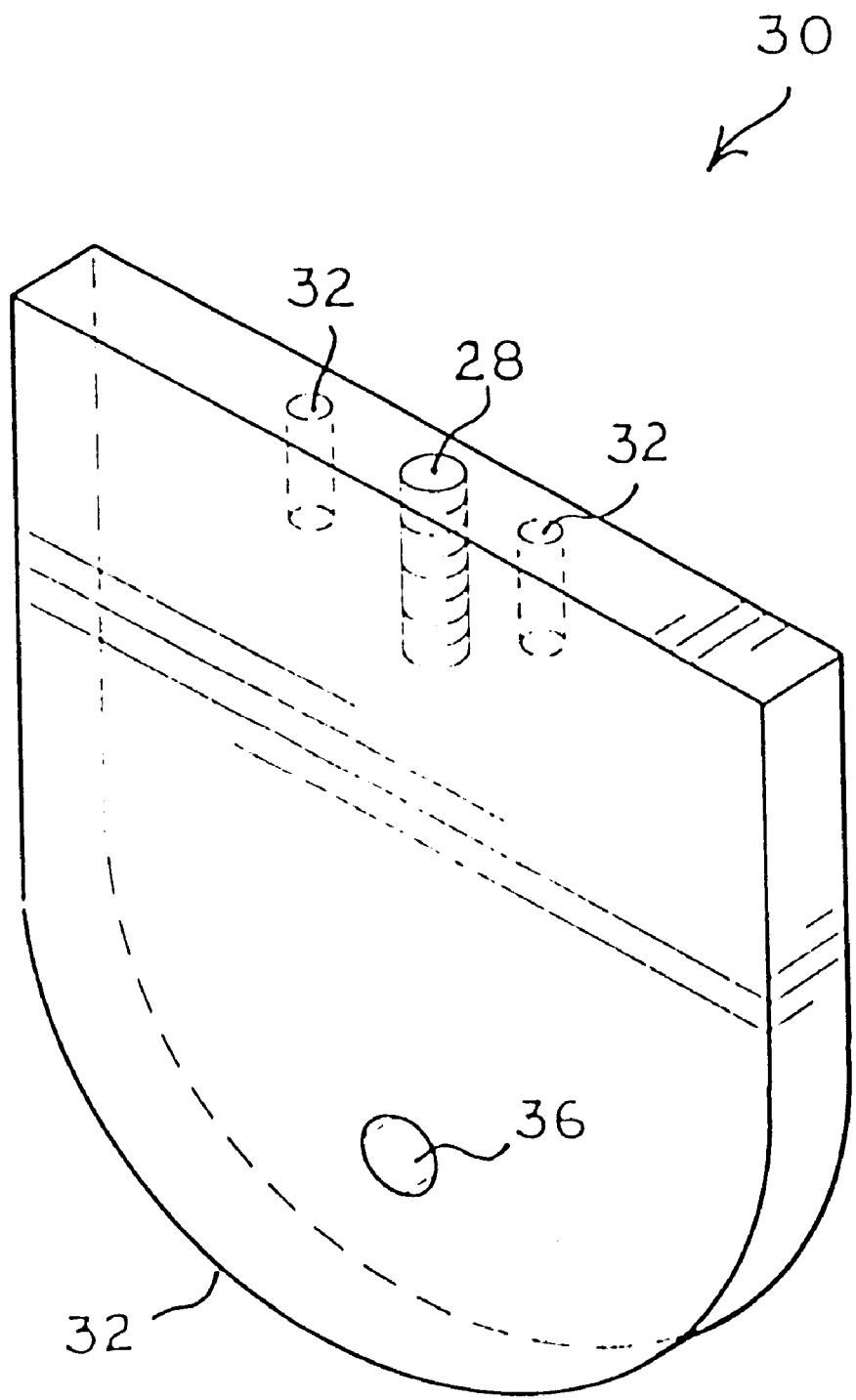
FIG. 5 is a perspective view of a pivot block.

In FIG. 1, a schematic front elevational view of a first embodiment of an articulated laser degree finder device 10 is illustrated for use on an installed pipe to locate exact positions of installing other pipes in a building. A laser element 12 depicted in FIG. 2 having an integral battery power source (hidden) and an on/off switch 14 is frictionally fitted inside the cavity 15 of a laser retainer jacket 16 shown in FIG. 3. A horizontal adjustment key 18 and a vertical adjustment key 20 are provided on the cylindrical laser element 12 (FIG. 2). The laser retainer jacket 16 has a pair of apertures 22 on each side of the shoulders 17 aligning the centered slot 19 for inserting fasteners 21 (FIG. 1) to fasten the laser retainer jacket to the upper four apertures 22 (a pair on each side) in a rectangular adapter block 24 shown in FIG. 4. The adapter block 24 has chamfered or beveled top edges 25. The adapter block 24 has a centered throughbore 26 for attachment of the block to a centered blind bore 28 in a pivot block 30 shown in FIG. 5. A pair of shallower blind bores 32 in the pivot block 30 aligned on the bottom on either side of the center blind bore 28 also coincide with a pair of blind bores 32 in the adapter block 24 for accurate alignment of these blocks by pins (not shown).

Figure 6:
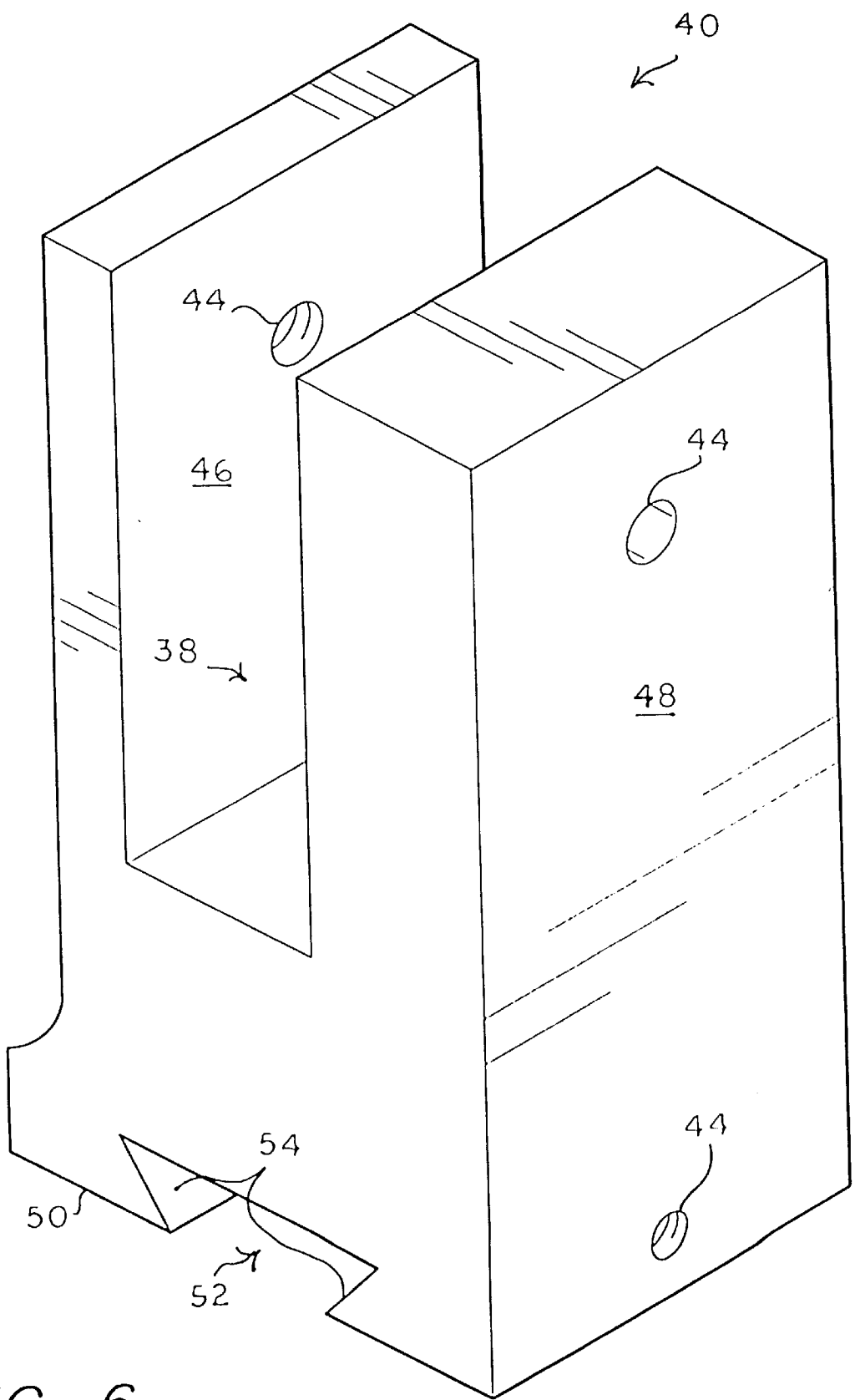
FIG. 6 is a perspective view of a pivot retainer block.

The pivot block 30 has an arcuate edge 34 with a throughbore 36 traversing the pivot block. The pivot block 30 is held in a pivotable position in a slot 38 of a pivot retainer block 40 shown enlarged in FIG. 6 by a fastener 42 (FIG. 1) in a pair of throughbores 44. The pivot retainer block 40 has one leg 46 which is thinner than the opposite leg 48. The thinner leg 46 is also arcuately shaped proximate the bottom face 50 which has a groove 52 with inclined sides 54.

Figure 7:
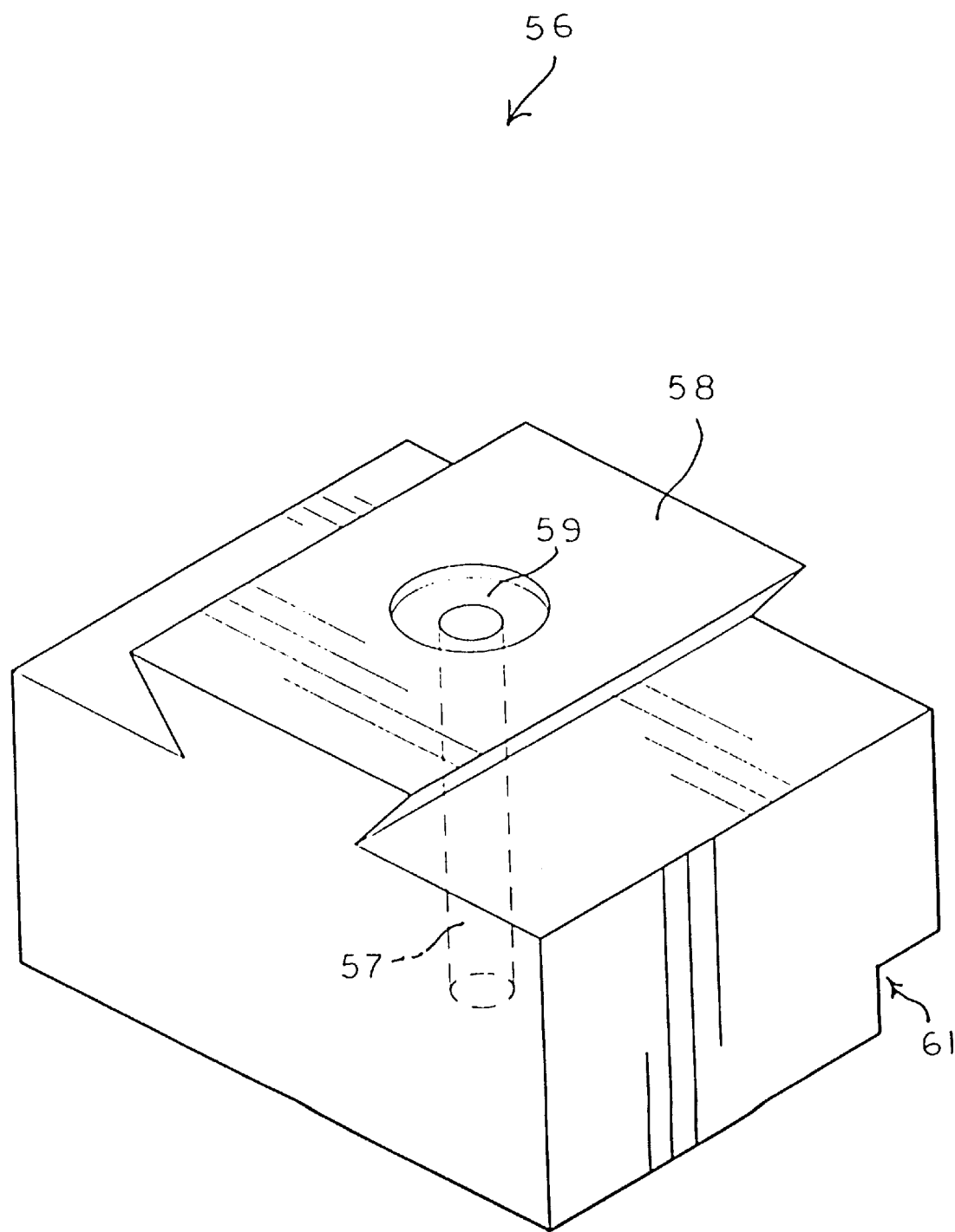
FIG. 7 is a perspective view of a main base extension block.

A main base extension block 56 shown in FIGS. 1 and 7 has a centered tongue element 58 for attaching it to the pivot retainer block 40 by another fastener 42 in another pair of lower horizontal through-bores 44 (FIG. 1). A centered throughbore 57 in the main base extension block 56 permits the anchoring of the entire structure above to a main base block 60 (FIGS. 1 and 8) by a bolt 59. A notch 61 is provided in the rear for a dial 68 (FIG. 9A).

Figure 8:
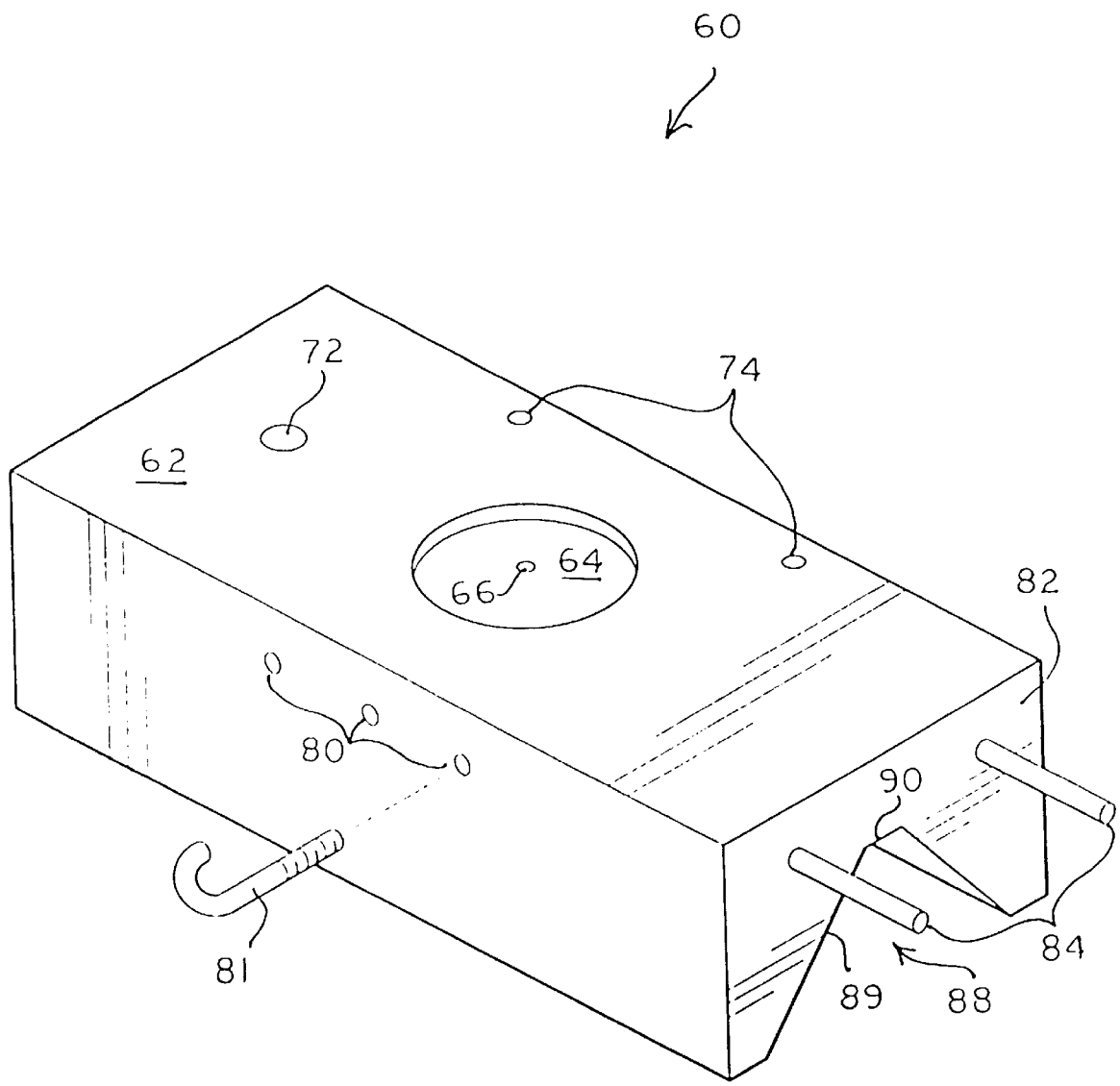
FIG. 8 is an exploded perspective view of a main base block.
Figure 9A:
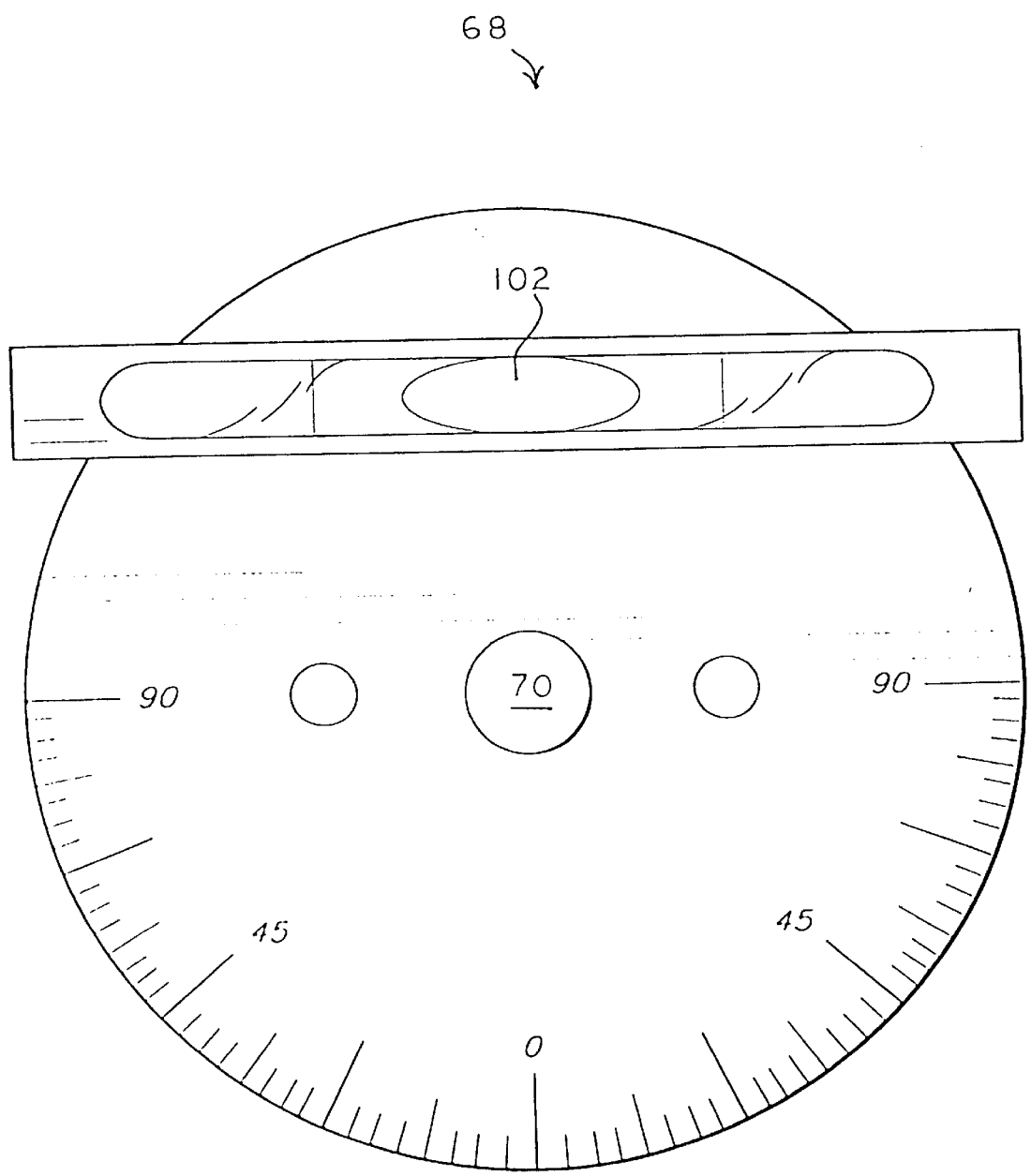
FIGS. 9A, 9B are top plan views of angle measurement dials.
Figure 10:
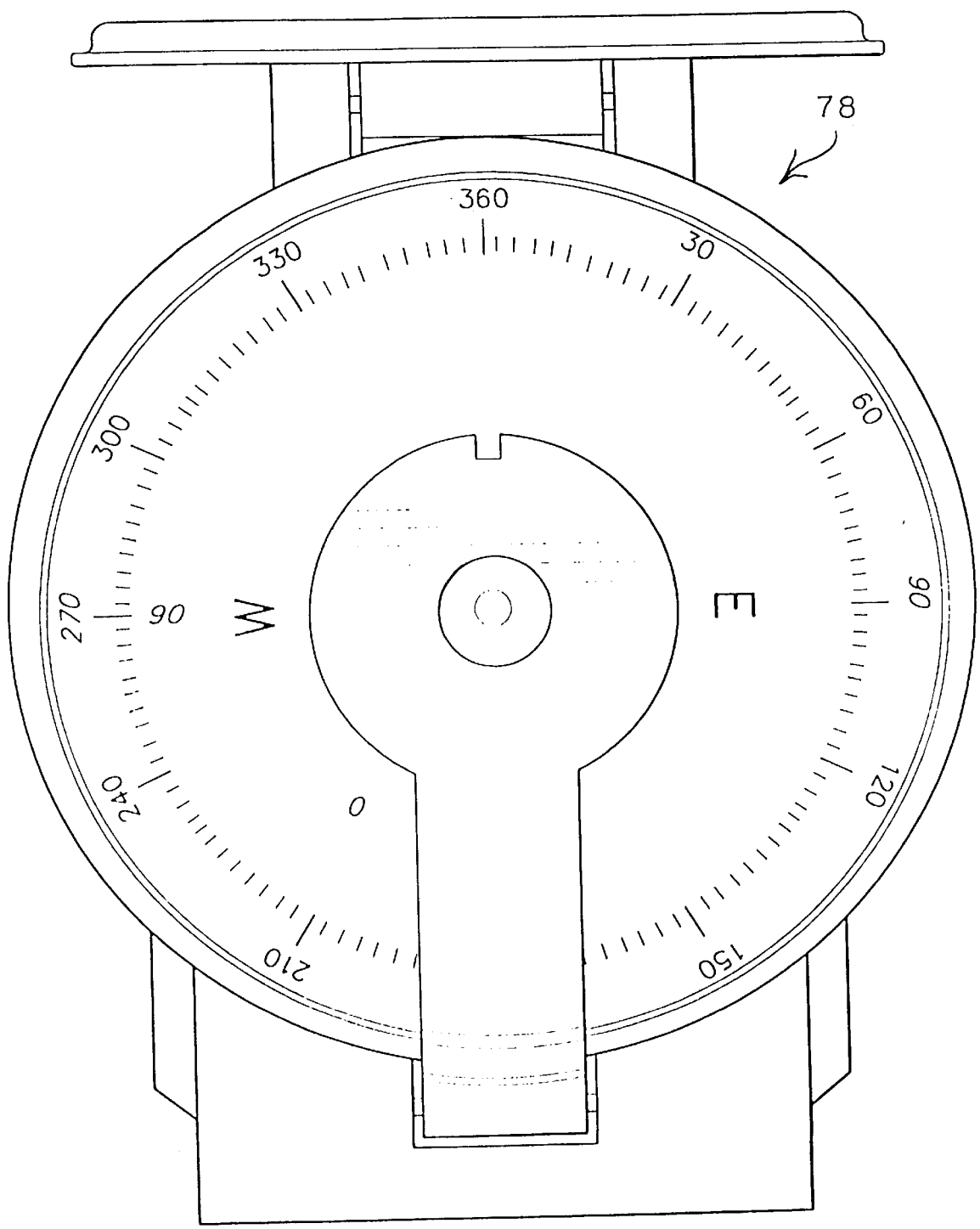
FIG. 10 is a top plan view of a compass.

FIG. 1 (front view) and FIG. 8 (rear view) show the main base block 60 as a first embodiment of a base which has a planar top surface 62 with a centered circular depression 64 having a centered throughbore 66 to retain a horizontal angle measurement dial 68 shown in FIG. 9A revolving about the pivot pin 70 inserted in the centered throughbore 66. Another retainer throughbore 72 is positioned in the rear portion of the top surface 62, actually in the front of the main base block 60 (see FIG. 1) to receive the bolt 59 anchoring the main base extension block 56. Two blind bores 74 are formed along a right side edge in FIG. 8 (but actually on a left side edge in FIG. 1) for anchoring a chain clamp 76 as a second attachment embodiment shown in FIG. 12 to be explained below. A compass 78 shown in FIG. 10 is positioned on a right-angled bracket 79 and attached by pins (not shown) into two of the three aligned blind bores 80 formed in the left side (on the right side in FIG. 1) and proximate the top surface 62 of the main base block 60. A clamp retaining hook 81 (FIG. 1) is inserted in the third blind bore 80. The front face 82 has a pair of pins 84 to be used for attachment to a vertical adjustment stand 108 as another embodiment shown in FIG. 11. One critical feature of the main base block 60 is the longitudinal notch 88 having inclined sides 89 and a flat apex portion 90 for positioning the reticulated laser degree finder device 10 on a base pipe.

Figure 12:
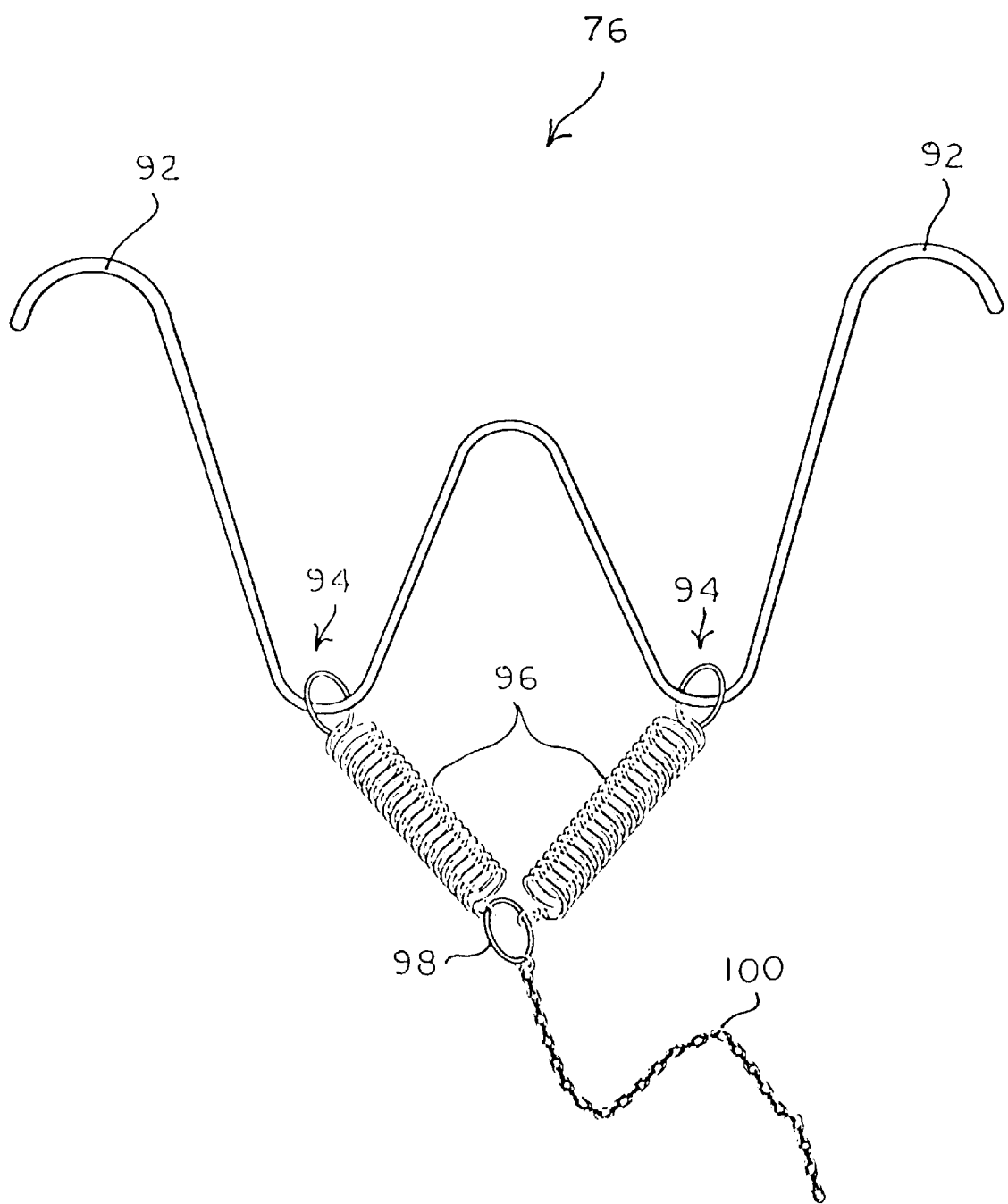
FIG. 12 is an elevational view of an adjustable chain strap clamp as a second embodiment of a clamping means.

The FIG. 1 device 10 can now be placed on a cylindrical or oval pipe by strapping with the W-shaped chain clamp 76 of FIG. 12 by inserting the curved ends 92 into the pair of blind bores 74 in the main base block 60. The opposite bent portions 94 of the chain clamp provide for attachment of a pair of springs 96 which are connected at their opposite ends to a ring 98 having a link chain 100. The distal end of the chain 100 is wrapped around the pipe used as a base and attached snugly to the clamp retaining hook 81 shown in FIG. 1.

Figure 9B:
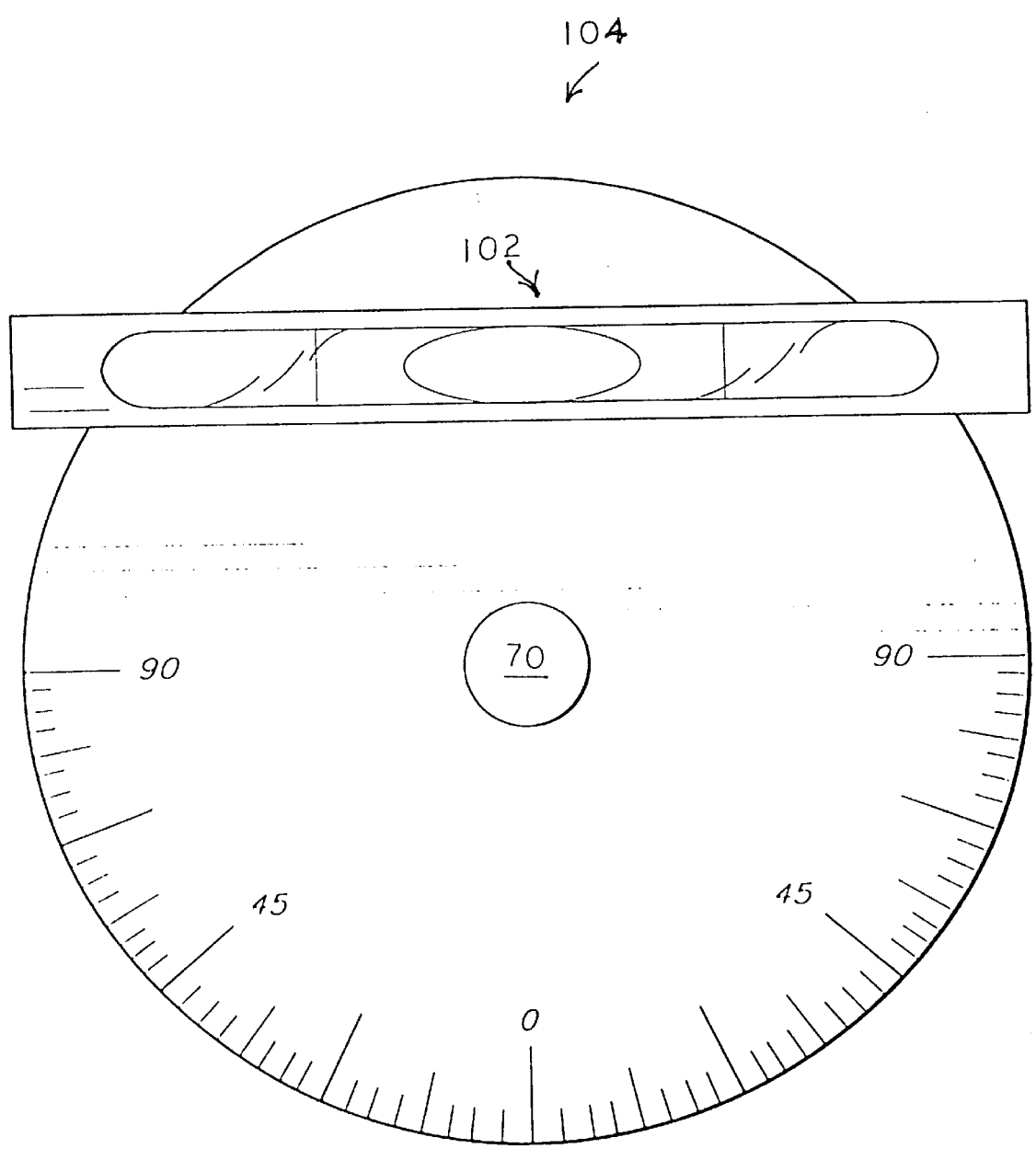

The device 10 is leveled on the pipe radially by utilizing the bubble level 102 of the horizontal angle measurement dial 68 having two 90° scales (FIG. 9A). If the base pipe is already level, the bubble level 102 of the vertical angle measurement dial 104 having the same scales on a pivot pin 70 (FIG. 9B) can be utilized to check the horizontal level. If the base pipe is not level in a longitudinal direction, the bubble level 102 of the vertical angle measurement dial can be used to level the device 10. If the next pipe is to be located at a perpendicular angle along a wall, the laser element 12 can be switched on and cause the laser light to illuminate a height on the opposite wall at the same level above the floor as the laser element 12 of the device 10. This technique can be used to locate different parallel levels on a wall for library shelves or inside a large tank for piping and the like.

If a vertical pipe on a cylindrical large volume tank is to checked for alignment or added, the device 10 can follow an existing pipe upward on the tank or mark the alignment on the tank as the laser element 12 is elevated.

The compass 78 in FIG. 10 has a cover 106 hinged to a compass body 108. The compass 78 is utilized when the device 10 is level to locate angular deviations and determine angles relative to true North.

Figure 11:
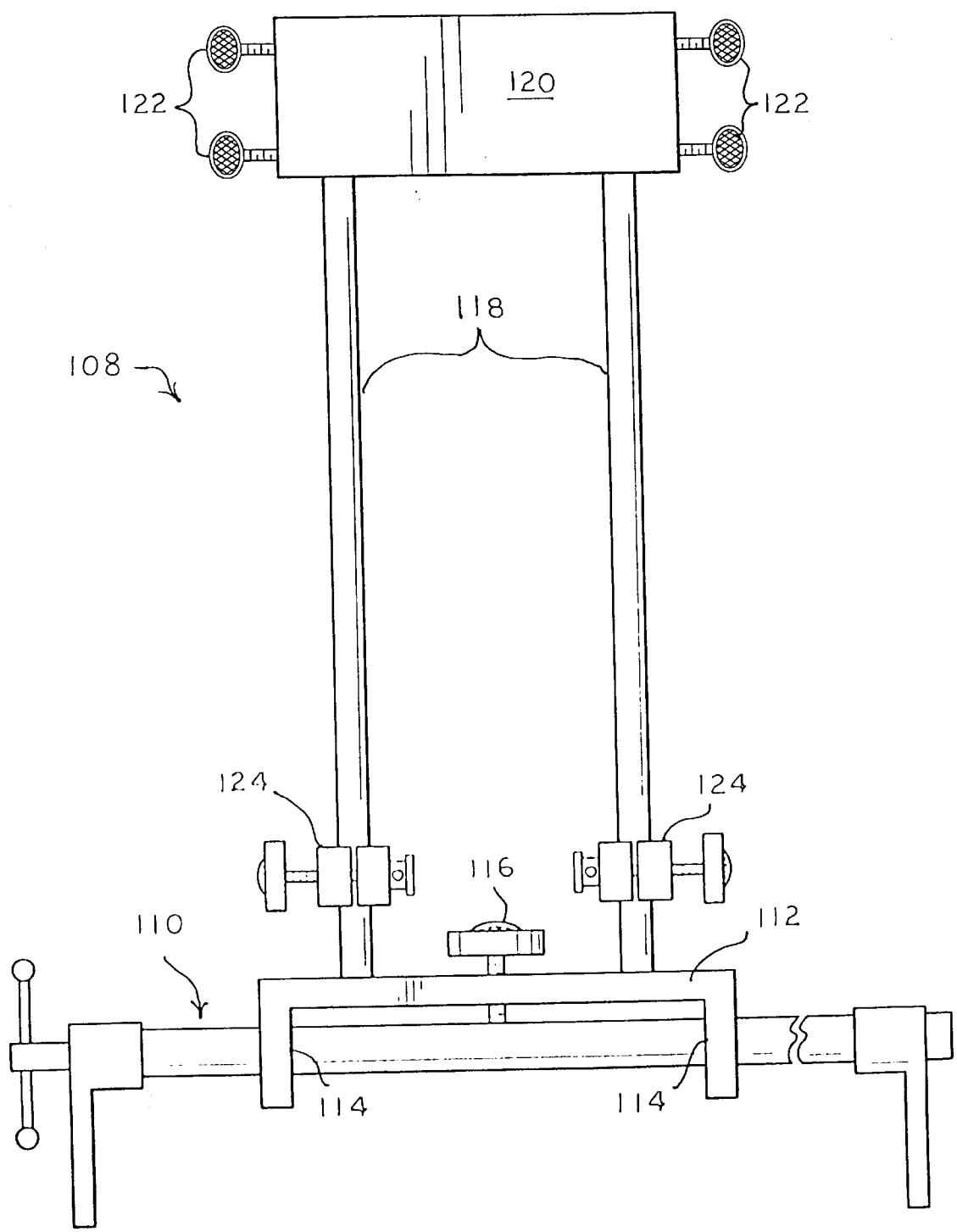
FIG. 11 is a perspective view of a vertical/horizontal clamp as a third embodiment of a clamping means.

A third embodiment of a vertical/horizontal clamping base 108 is illustrated in FIG. 11. A bar clamp 110 is used as a base for an adjustable slide 112 apertured at its ends 114 to slide along the bar clamp 110 but fixed by a set screw 116. The slide 112 supports two standards 118 fixed at their distal ends by a stabilizer block 120 containing a pair of knob screws 122 at each end. A pair of adjustable slide clamps 124 are positioned on the standards 118 to hold the device 10 by the two pins 84 (FIG. 1). This clamping base 108 can now be clamped around a block (not shown) for further adjusting the height of the articulated laser degree finder device 10.

Figure 13:
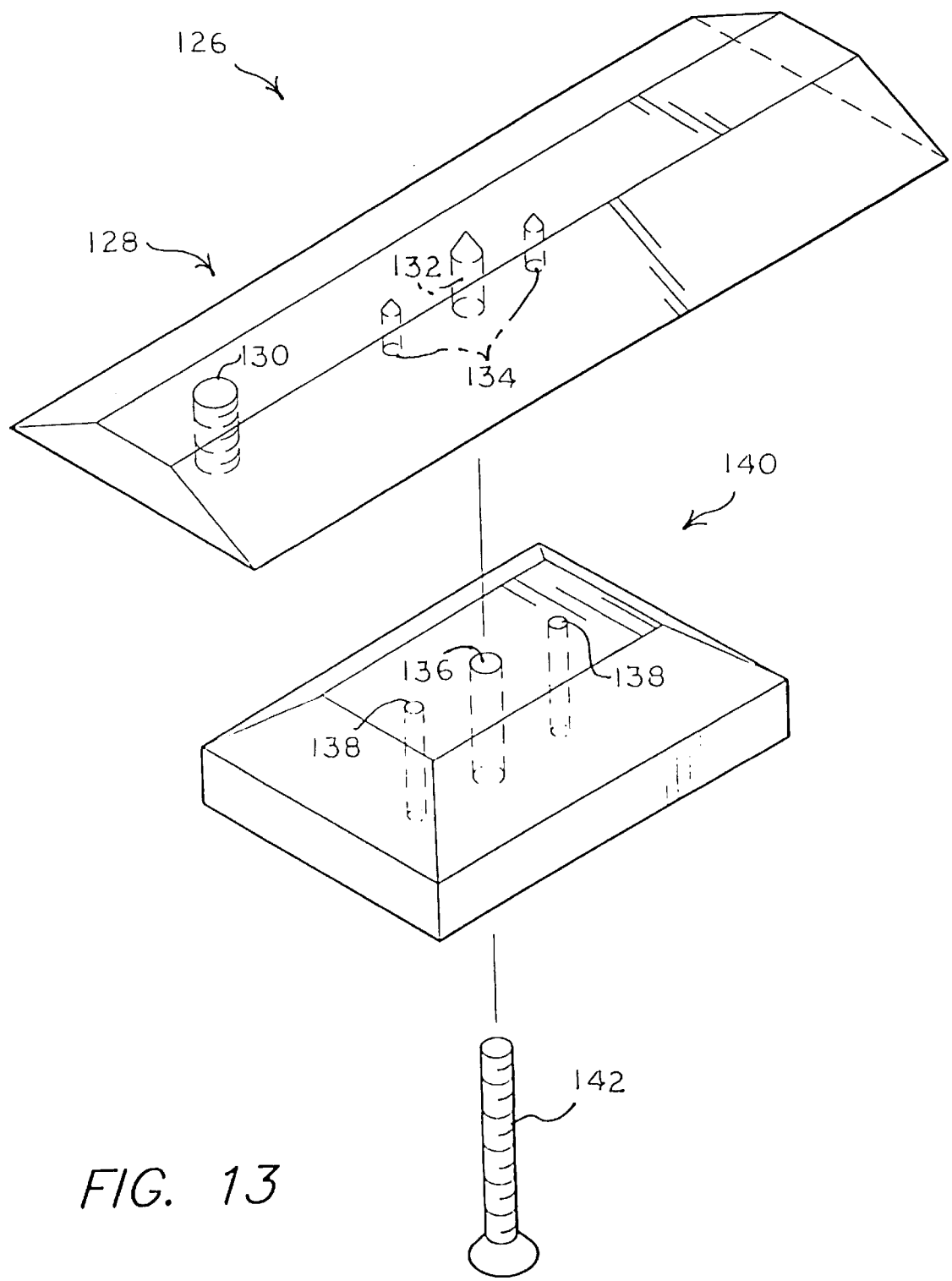
FIG. 13 is an exploded perspective view of a two-piece clamp for attaching to a photographer's tripod as a fourth embodiment of a clamping means.

FIG. 13 is drawn to the fourth embodiment of an attachment base system 126 for a tripod (not shown). An upper main block 128 with a commensurate length and a trapezoidal cross-section has a large throughbore 130 at one end for attachment of a threaded stud (not shown) to connect the main base block 60 of the articulated laser degree finder device 10. A set of three threaded blind bores comprising a center blind bore 132 with two side blind bores 134 which align with a threaded throughbore 136 and two side throughbores 138 of a smaller tripod adapter block 140 having truncated pyramidal structure. A bolt 142 is provided to connect the tripod to the tripod adapter block 140 and the upper main block 128. This arrangement permits the device 10 to be located on conventional tripod support.

Figure 14:
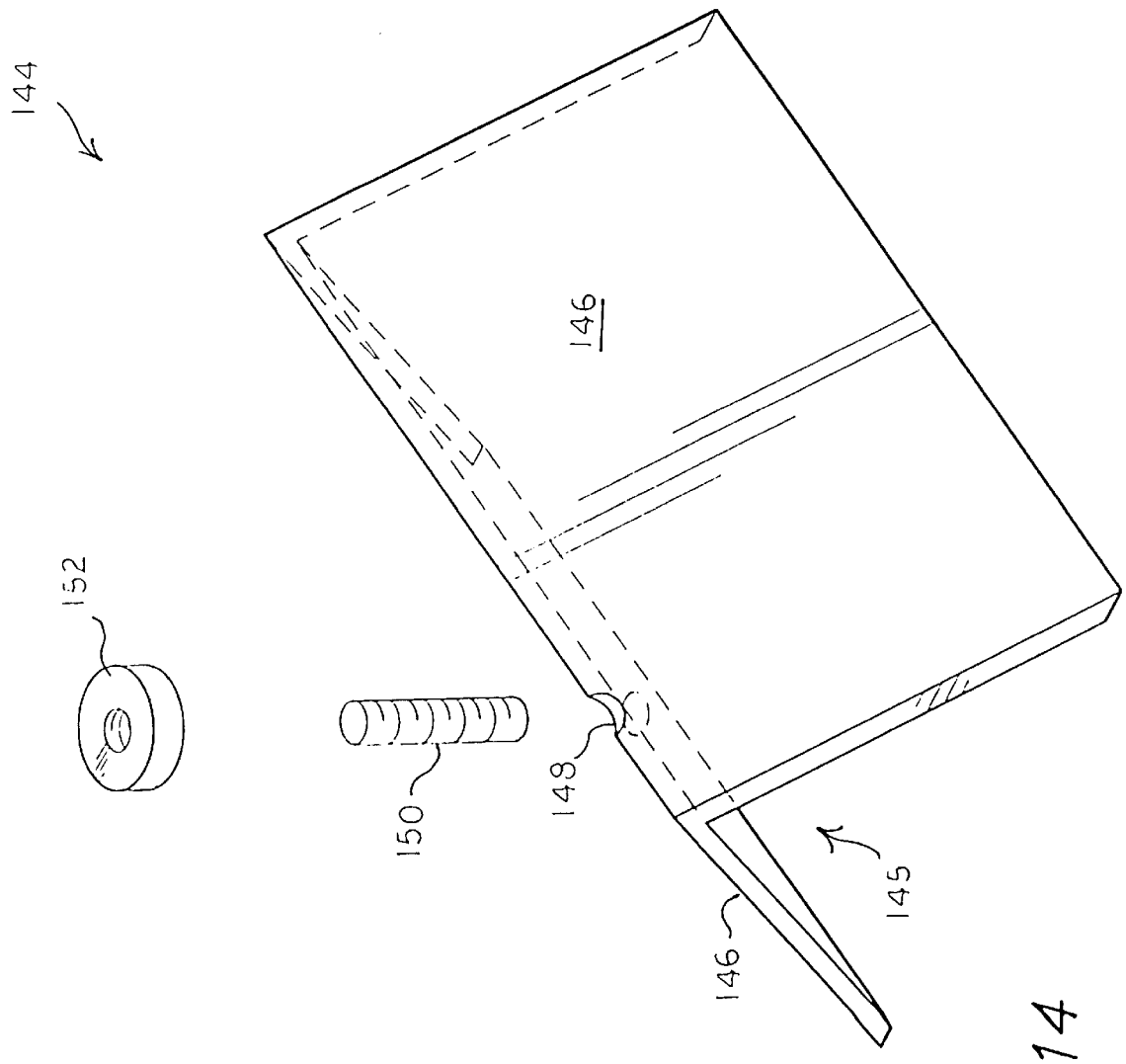
FIG. 14 is an exploded elevational view of a clamp for a large bore pipe as a fifth embodiment of a clamping means.

FIG. 14 is drawn to a fifth embodiment for providing an extended base clamp 144 for supporting the device 10 on large bore or diameter pipes with an inverted V-shaped adapter element 145 with planar sides 146. A threaded throughbore 148 is provided on the apex proximate one end for attaching the device 10 with a threaded stud 150 and a threaded round nut 152.

Figure 15A:
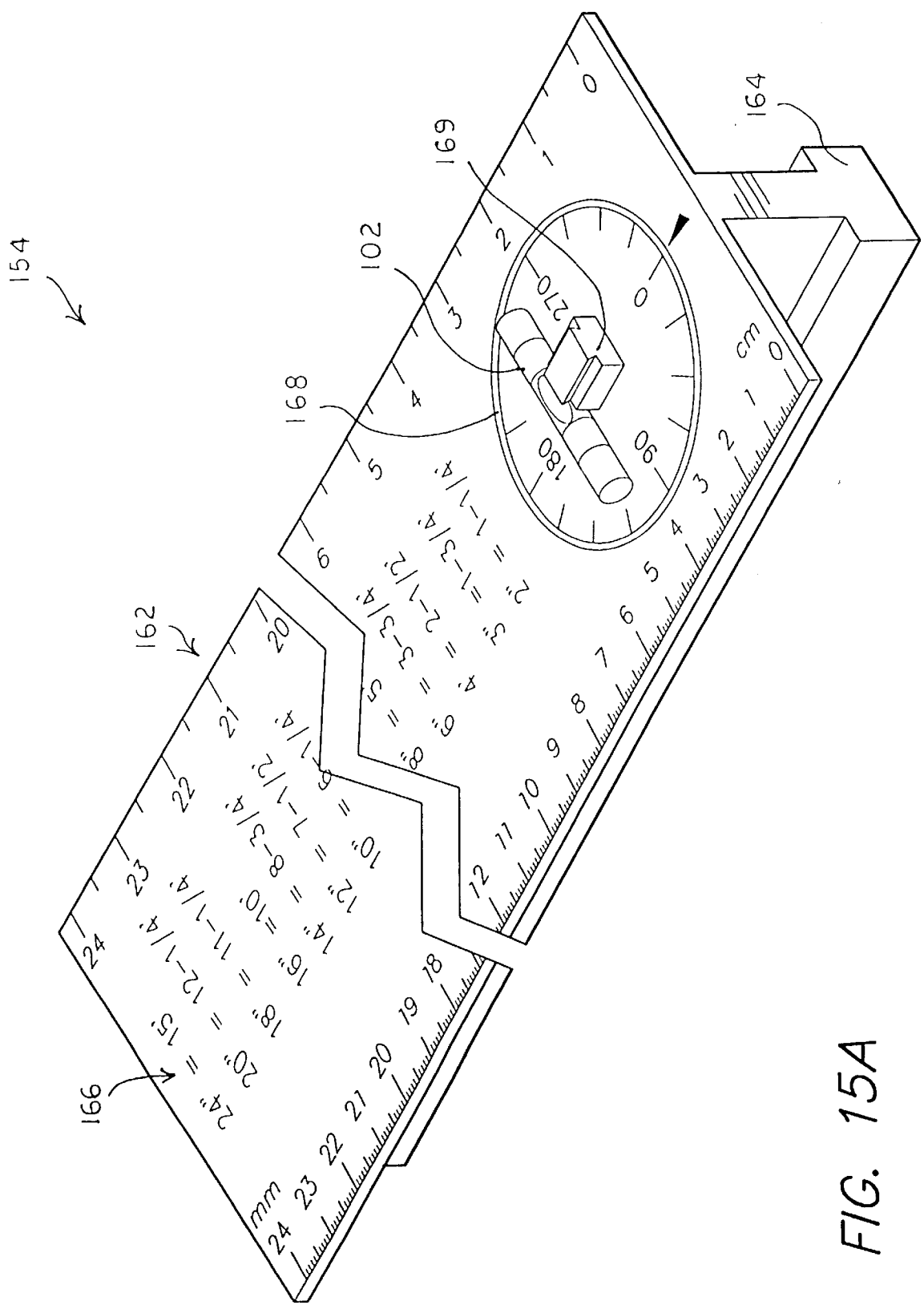
FIG. 15A is a perspective view of a sliding ruler for a sixth embodiment of an articulate laser degree finder device.
Figure 15B:
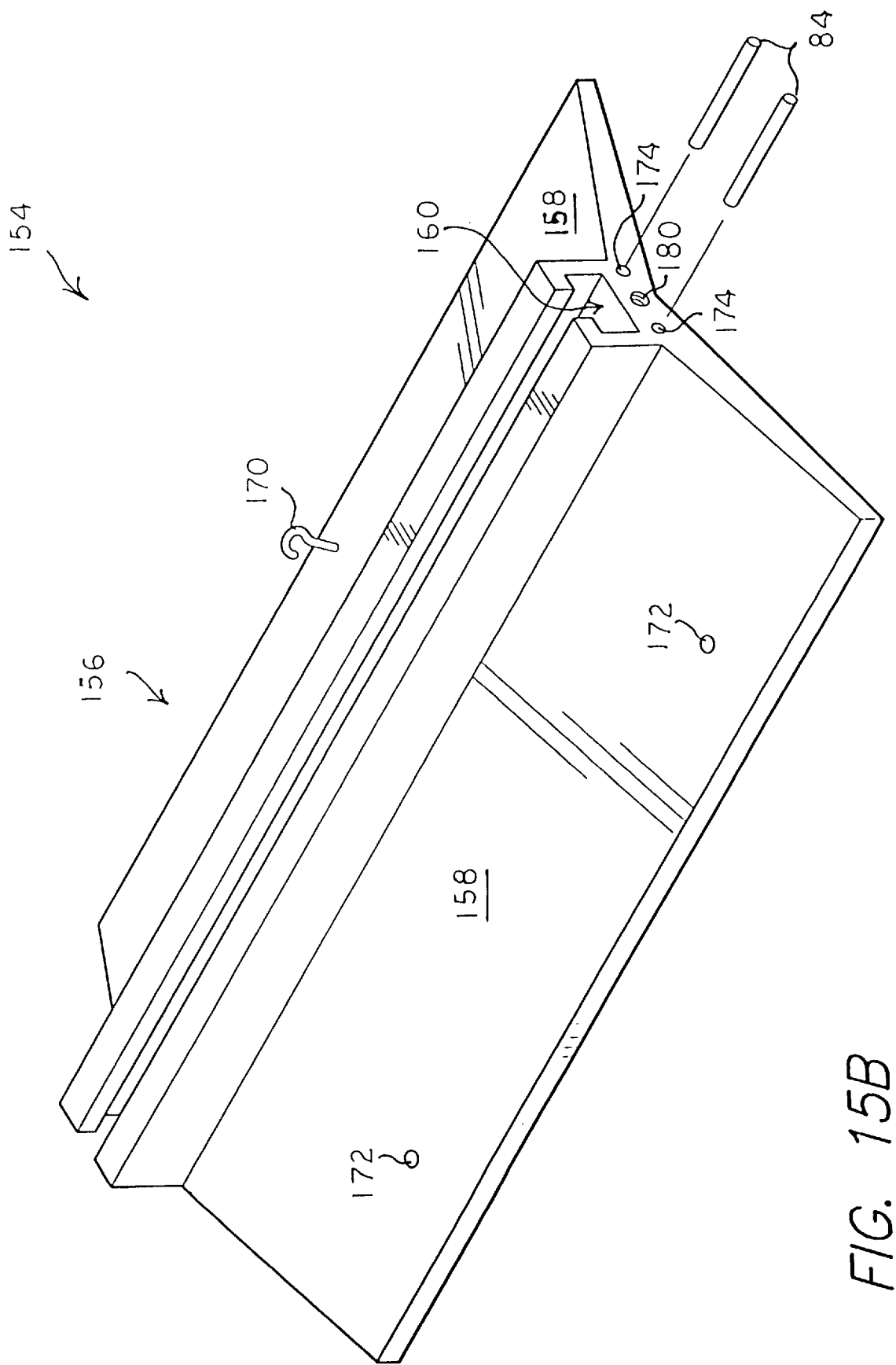
FIG. 15B is a perspective view of a base for the sliding ruler of the sixth embodiment.

FIGS. 15A and 15B illustrate a sixth embodiment device 154 for finding the center position at the end of a large pipe and a tie-in to a 45° or 90° elbow connection. The base 156 (FIG. 15B) 6 inches long with planar legs 158 extending 4 inches is positioned at the end of a large pipe. A longitudinal, centered groove 160 on top accommodates the sliding ruler 162 (FIG. 15A) provided with British and metric units on opposite edges and a tongue portion 164. The two feet long sliding ruler 162 also contains Bluebook indicia 166 for determining the take-off to the center of the pipe by utilizing Grave's Bluebook of Pipe Fitting, 1999. A rotatable 360° dial 168 with a bubble level 102 is located at the front of the ruler 162. A tongued bracket 169 on the dial 168 supports the laser device 10 of FIG. 1, but excluding the remainder from the main base extension block 56. The base 156 has a hook 170 on one planar leg 158 and two widely separated holes 172 on the opposite leg 158 for utilizing the chain clamp 76 of FIG. 12 to clamp the device 154 onto a large diameter pipe.

Figure 16:
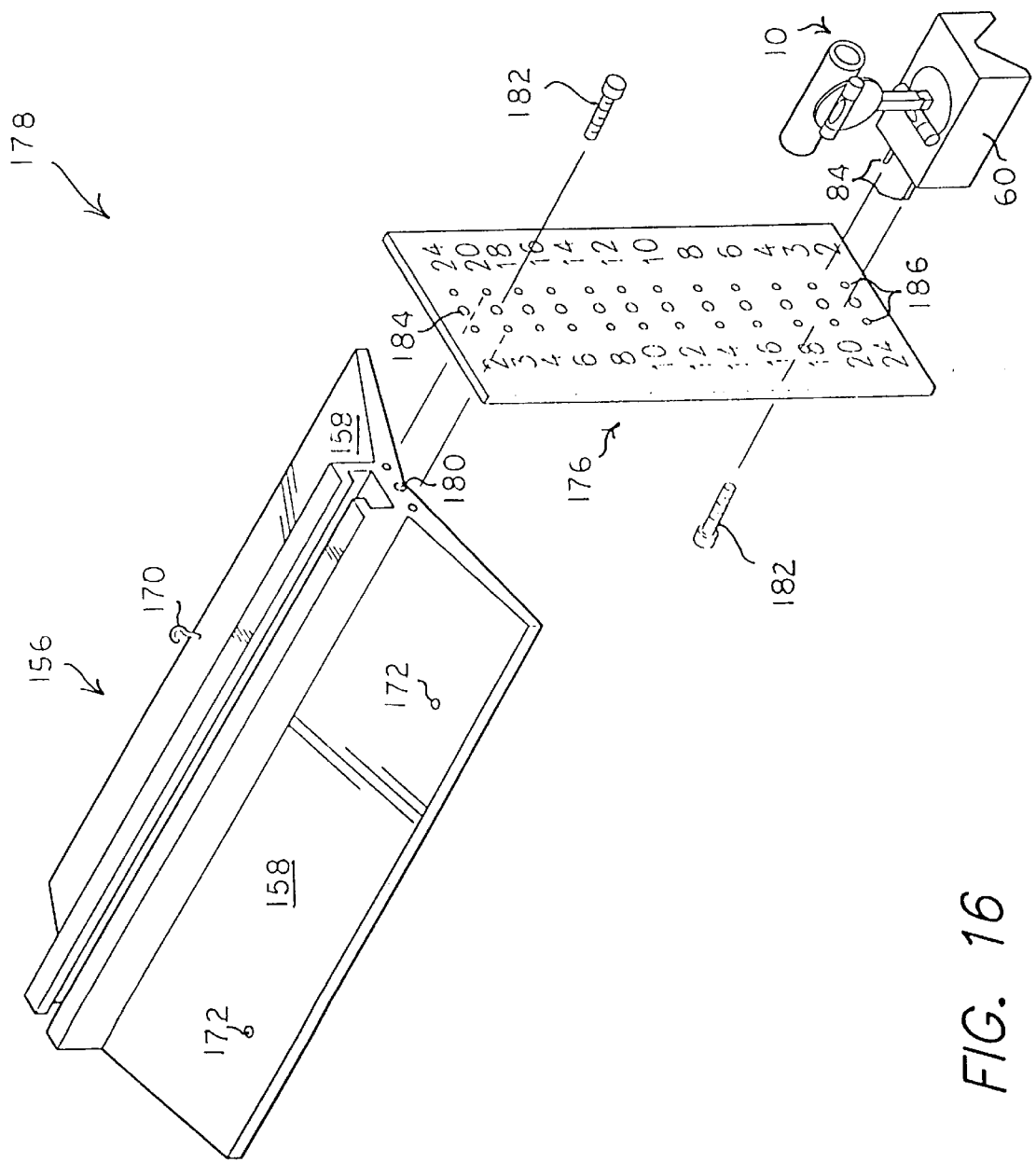
FIG. 16 is an exploded perspective view of a seventh embodiment of the present invention having a vertically positioned ruler.

Two small diameter blind bores 174 are positioned on the front face of the base 156 to mount an upright ruler 176 and offset in FIG. 16 as a seventh embodiment device 178. The centered and threaded large diameter blind bore 180 is also provided in the front end of the base 156 for attachment of the upright ruler 176 by a roundheaded screw 182 via the centered column of larger apertures 184. The pins 84 of the main base block 60 of the reticulated laser degree finder device 10 fit into the two columns of apertures 186 and another roundheaded screw 182 secures the device 10 to the lower portion of the upright ruler 176. This embodiment device 178 is used to determine any vertical or horizontal tie-in point from the center of the pipe used as a base.

It is to be understood that the present invention is not limited to the embodiments described above, but encompasses any and all embodiments within the scope of the following claims.

I claim:

1. An articulate laser degree finder system comprising:
   an articulate laser degree finder unit comprising:
   a tubular battery operated laser unit having an on/off switch and vertical and horizontal adjustment keys;
   a laser retainer jacket comprising apertures on an upper portion thereof for access to the horizontal and vertical adjustment keys of the laser unit and a slot on a bottom portion thereof;
   a rectangular adapter block element interfitting and secured to the slot of the laser retainer jacket;
   a pivot block element connected to the bottom of the adapter block element adapted to pivot the laser, the laser retainer jacket and the adapter block element;
   a pivot retainer block element having a slot on its upper surface and a groove in a bottom surface;
   a vertical adjustment dial and bubble level pivotally attached to a vertical side of the pivot retainer block element by a pivot pin;
   said pivot pin also traversing the pivot retainer block element and the pivot block element;
   a main base extension block element having a tongue portion on its upper surface adapted to engage the groove in the bottom surface of the pivot retainer block element and secured by a fastener in the pivot retainer block element;
   a main base block configured with an extended flat top surface having a centered depression and a throughbore, and a longitudinal notch on its bottom surface with inclined sides adapted to fit on a pipe used as a final base; and
   a horizontal angle measurement dial and bubble level pivotally attached to the top surface of the base block in the depression;
   whereby the articulated laser degree finder device can determine suitable locations in any direction and in any angle deviating from the horizontal for locating exact positions for installing another pipe, checking alignment of pipes, and determining the positions for various installations.

2. The articulate laser degree finder system according to claim 1, including a compass on a bracket attached to a first vertical side of the main base block.

3. The articulate laser degree finder system according to claim 2, including a hook attached to a second vertical side opposite said first vertical side of the main base block.

4. The articulate laser degree finder system according to claim 3, including a W-shaped chain clamp having hooked ends for clamping onto one edge of the main base block and a pair of springs attached to the chain clamp and to a chain for attaching to the hook on the main base block for securing the articulate laser degree finder system to a pipe used a reference base.

5. The articulate laser degree finder system according to claim 1, including a pair of horizontal pins extending from a front face of the main base block.

6. The articulate laser degree finder system according to claim 5, including a vertical adjustment stand comprising a bar clamp, an adjustable slide having securing means slidable on said bar clamp, a two parallel standards attached to said adjustable slide at their bottom portions, a stabilizer bar attached to the standards at their top portions; and an adjustable slide clamp positioned on each said standard; whereby the articulated laser degree finder unit can be elevated vertically in height when the bar clamp is positioned on a base.

7. The articulate laser degree finder system according to claim 1, including an attachment base system for positioning the articulate laser degree finder unit on a photographer's tripod, comprising an elongated upper main block having a throughbore for attaching the articulate laser degree finder unit proximate one end thereof, said upper main block having three blind bores, a tripod adapter block having three throughbores aligned with said blind bores, two fasteners to secure the upper main block to the tripod adapter block, and a fastener to secure the combined upper main block and the tripod adapter block to the photographer's tripod.

8. The articulate laser degree finder system according to claim 1, comprising an inverted V-shaped clamping element having planar sides for positioning on large diameter pipes, said clamping element having a threaded throughbore proximate one end, a threaded stud, a threaded round nut for securing said stud in said clamping element, and said threaded stud securing the articulate laser degree finder unit to said clamping element.

9. The articulate laser degree finder system according to claim 1, including a sliding ruler system for supporting the articulate laser degree finder unit on large diameter pipes, comprising a base element having a longitudinal axis and two planar legs separated by an obtuse angle, one leg having a hook and the other leg having a pair of throughbores, a grooved portion positioned on top of the base element along the longitudinal axis, a slidable planar ruler having a tongue portion underneath for cooperating with the grooved portion of the base element, two pins extending horizontally from one end of the base element, said slidable ruler having indicia imprinted for measuring distance in British and metric units on separate sides thereof, and a rotatable circular dial measuring 360° and supporting a tongue portion and a bubble level for measuring offset angles for the laser degree finder unit attached to the tongue of the base element.

10. The articulate laser degree finder system according to claim 9, including a W-shaped chain clamp having hooked ends for clamping onto one edge of the main base block and a pair of springs attached to the chain clamp and to a chain for attaching to the hook on the main base block for securing the articulate laser degree finder system to a pipe used a reference base.

11. The articulate laser degree finder system according to claim 1, including a center line pipe plate adapter system for holding the articulate laser degree finder unit, comprising a base element having a longitudinal axis and two planar legs separated by an obtuse angle, one leg having a hook on a top surface and the other leg having a pair of throughbores, a planar ruler having a centered column of large diameter apertures and a column of smaller diameter apertures on either side of the large diameter aperture on a front face thereof for positioning the ruler vertically on and normal to the end of the base element with a first fastener in one of the upper large diameter apertures, said planar ruler having height indicia on one edge in increasing units and in decreasing units or the opposite edge corresponding to the apertures in each row, and said smaller diameter apertures adapted to fasten the articulate laser degree finder unit having a pair of horizontal pins extending from a front face of the main base block and aligned with a second fastener inserted in said larger diameter aperture.

12. The articulate laser degree finder system according to claim 11, including a W-shaped chain clamp having hooked ends for clamping onto one edge of the main base block and a pair of springs attached to the chain clamp and to a chain for attaching to the hook on the main base block for securing the articulate laser degree finder system to a pipe used a reference base.

\* \* \* \* \*